United States Patent [19]

Sakata

[11] Patent Number: 5,423,064
[45] Date of Patent: Jun. 6, 1995

[54] RECEIVED SIGNAL STRENGTH INDICATOR LEVEL MONITOR CIRCUIT FOR DIGITAL MOBILE COMMUNICATION SYSTEM

[75] Inventor: Minoru Sakata, Sendai, Japan
[73] Assignee: Fujitsu Limited, Kawasaki, Japan
[21] Appl. No.: 959,662
[22] Filed: Oct. 13, 1992
[51] Int. Cl.$^6$ ............................................. H04Q 7/00
[52] U.S. Cl. .................... 455/33.2; 455/56.1; 455/67.1; 455/307; 379/60; 370/95.1
[58] Field of Search .............. 455/67.1, 33.1, 33.2, 455/226.1, 226.2, 307, 306, 56.1; 370/29, 80, 95.1, 95.2; 379/59, 60

[56] References Cited

U.S. PATENT DOCUMENTS

| | | | |
|---|---|---|---|
| 4,360,928 | 11/1982 | Campbell | 455/226.3 |
| 5,042,082 | 8/1991 | Pahlin | 455/33.2 |
| 5,067,171 | 11/1991 | Kawano | 455/33.2 |
| 5,127,100 | 6/1992 | D'Amico et al. | 455/33.1 |
| 5,179,559 | 1/1993 | Crisler | 455/33.1 X |
| 5,222,253 | 6/1993 | Heck | 455/78 |

FOREIGN PATENT DOCUMENTS 9112676 8/1991 WIPO .

*Primary Examiner*—Edward F. Urban
*Attorney, Agent, or Firm*—Greer, Burns & Crain, Ltd.

[57] ABSTRACT

In a digital mobile communication system wherein one communication channel is used by a plurality of system users by time sharing, the communication channel being used in a certain zone is switched to a predetermined other communication channel when the user moves from the communication zone to another neighboring zone, and RSSI levels of the predetermined communication channels in the neighboring zones are monitored by using an empty slot of the communication channel preparing for the channel switching during the communication of the user in the channel, a monitor circuit for the RSSI level of the system includes two band pass filters having a narrow frequency band width and a wide frequency band width connected in parallel with a switch that activates only one of them. In the receiving slot, the filter having a narrow frequency band width is used and in the empty slot, the frequency of the first local oscillator is changed to the monitor channel and the filter having a wide frequency band width is used, so that the RSSI level can be detected within the empty slot.

4 Claims, 9 Drawing Sheets

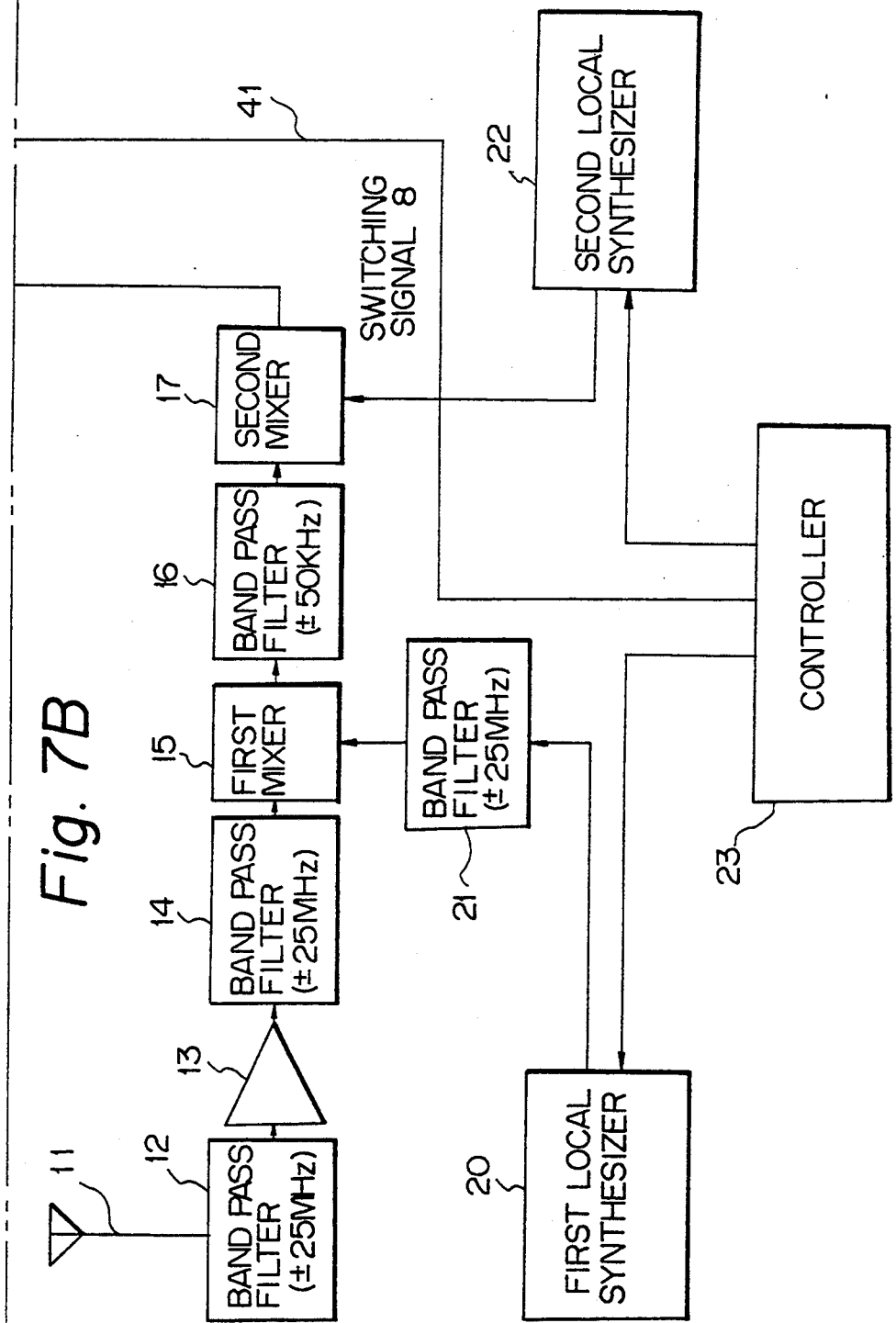

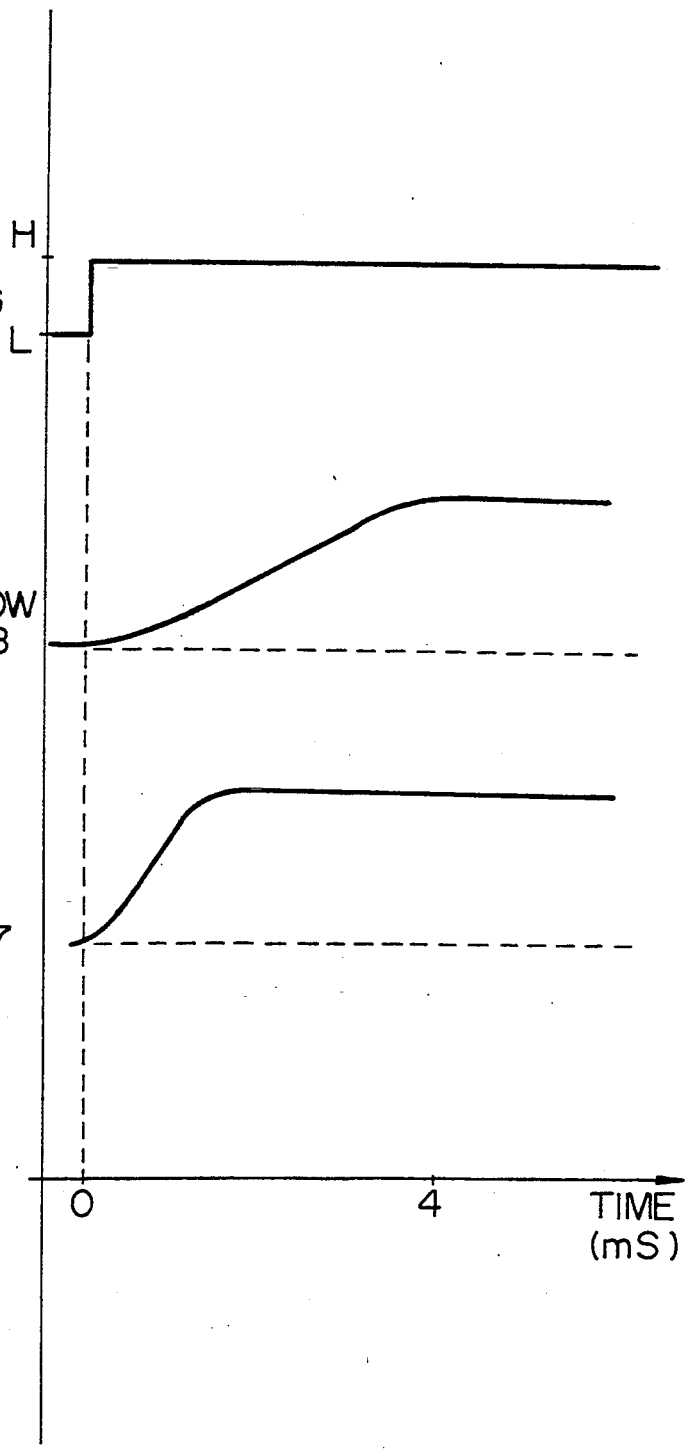

RECEIVED SIGNAL STRENGTH INDICATOR LEVEL MONITOR CIRCUIT FOR DIGITAL MOBILE COMMUNICATION SYSTEM

BACKGROUND OF THE INVENTION

1) Field of the Invention

The present invention relates to a received signal strength indicator level monitor circuit for a digital mobile communication system. More specifically, the present invention relates to a received signal strength indicator level monitor circuit that can monitor the received signal strength of related channels of a presently receiving channel in other service areas at high-speed.

2) Description of the Related Art

The automobile has become indispensable in contemporary life, and comfort and convenience when driving has become increasingly important. To this end, vehicles can be provided with a mobile communication system which can be used as a telephone system.

An automobile equipped with a mobile communication system, e.g., a mobile telephone system, is called a mobile station, and this mobile station can communicate not only with a fixed telephone such as a telephone in an office or at home but also with another mobile station. This communication is established by radio waves between the mobile station and a land station, and is transferred to a conventional telephone system at the land station.

In a typical analog mobile communication system, a user of the system occupies one frequency for transmission and an another frequency for receiving to communicate. This system is called frequency-division multiple access (FDMA) in a mobile communication system. However, this FDMA is not efficient since one user occupies two frequencies and useable frequencies are decreased as the users of the system increase.

To cope with this inefficiency, a digital mobile communication system is now proposed for practical use. In the digital mobile communication system, a plurality of users, for example, three users occupy one frequency for transmission and another frequency for receiving to communicate by time-sharing. This system is called time-division multiple access (TDMA) in a mobile communication system. To make the explanation brief, a TDMA mobile communication system will be explained hereinafter wherein three users share one frequency. Namely, in the TDMA digital mobile communication system, one frequency is divided into a time unit called a slot, one user can use ⅓ of every slot, and by digital processing, time intervals in every slot for one user are omitted and a telephone call is smoothly continued. Accordingly, from the point of time in the TDMA mobile communication system, one slot is divided into three sections, and ⅓ thereof is used for transmitting a call, ⅓ thereof is used for receiving a call, and ⅓ thereof is empty.

Incidentally, in the mobile communication system, a service area of one land station that is called a zone is limited, and according to the movement of the mobile station from a certain zone to another zone, the mobile station has to change communication channels by changing the communication frequency. Accordingly, in the TDMA digital mobile communication system, when the mobile station is communicating by using one channel at a certain zone, the mobile station intermittently detects the RSSI (received signal strength indicator) levels of the other channels in neighboring zones one by one by using the empty slot. Note that, the useable channels in the neighboring zones are previously determined by the system. The detected RSSI levels of the other channels in the neighboring zones are reported to the land station to which the mobile station is now communicating, and the reported RSSI levels are monitored by the land station. As a result, when the mobile station moves to an other zone, a suitable channel having the highest RSSI level at the other zone is selected by the land station, and the switching of the communication channel is executed.

However, in the TDMA digital mobile communication system, one slot comprises only 20 ms, so that the empty slot for detecting the RSSI level of the other channel has only about 6.7 ms, as a result, high-speed detection of the RSSI level is required.

SUMMARY OF THE INVENTION

An object of the present invention is to provide a received signal strength indicator level monitor circuit for a digital mobile communication system by which the detection of the RSSI level is executed at high-speed and without a substantial amount of incrementing of the circuit elements.

According to an aspect of the present invention, there is provided a monitor circuit for the RSSI level of the system in a digital mobile communication system wherein one communication channel is used by a plurality of system users by time sharing, the communication channel being used in a certain zone is switched to a predetermined other communication channel when the user moves from the communication zone to an another neighboring zone, and RSSI levels of control channels in the neighboring zones are monitored by using an empty slot of the communication channel preparing for the channel switching during the communication of the user in the channel, comprising: a radio frequency amplifying part for amplifying a radio frequency signal received by an antenna; a first local oscillator comprised of a synthesizer; a first mixer for mixing the amplified radio frequency and an output signal of the first local oscillator; a first intermediate frequency filter having a wide band-pass range for passing a first intermediate frequency from the first mixer; a second local oscillator comprised of a synthesizer; a second mixer for mixing an output signal of the first intermediate frequency and an output signal of the second local oscillator; a second intermediate frequency filter having a narrow band-pass range for passing a second intermediate frequency from the second mixer; a controller for changing output frequencies of the first and second oscillator by using the empty slot during the communication of the user, and for monitoring the RSSI levels of other channels in the neighboring zones at the output side of the second intermediate frequency filter; another second intermediate frequency filter having a wide band-pass range for passing a second intermediate frequency from the second mixer provided in parallel to the second intermediate frequency filter; and switches for switching of the connection of the second intermediate frequency filters having narrow or wide band width in accordance with a control signal from the controller, functioning so that the intermediate frequency flows in the filter having a narrow band width for the user's transmitting/receiving operation and the intermediate frequency flows in the filter having a wide band width for the RSSI monitoring operation.

According to the present invention, when the RSSI monitor operation is executed by using the empty slot during the communication of the user of the system, the band pass filter for the second intermediate frequency is switched from the filter having the narrow frequency band width to the filter having the wide frequency band width. As a result, the RSSI monitor signal is output from the second intermediate frequency filter in a short time, so that monitoring of the RSSI level is finished during the empty slot.

BRIEF EXPLANATION OF THE DRAWINGS

The present invention will be more clearly understood from the description as set forth below with reference to the accompanying drawings, wherein:

FIGS. 7A and 7B are a block diagram showing the construction of the RSSI level monitor circuit according to the one example of the present invention: and FIGS. 8A to 8C are timing charts comparing the rising characteristics of the second intermediate frequency filters having a wide and narrow band width as shown in FIG. 7, after the channel switching signal is changed at the beginning of the empty slot.

DESCRIPTION OF THE PREFERRED EMBODIMENTS

Before describing the preferred embodiments, an explanation will be given of the conventional received signal strength indicator level monitor circuit for a digital mobile communication system, with reference to FIGS. 1 to 6.

Figure 1:
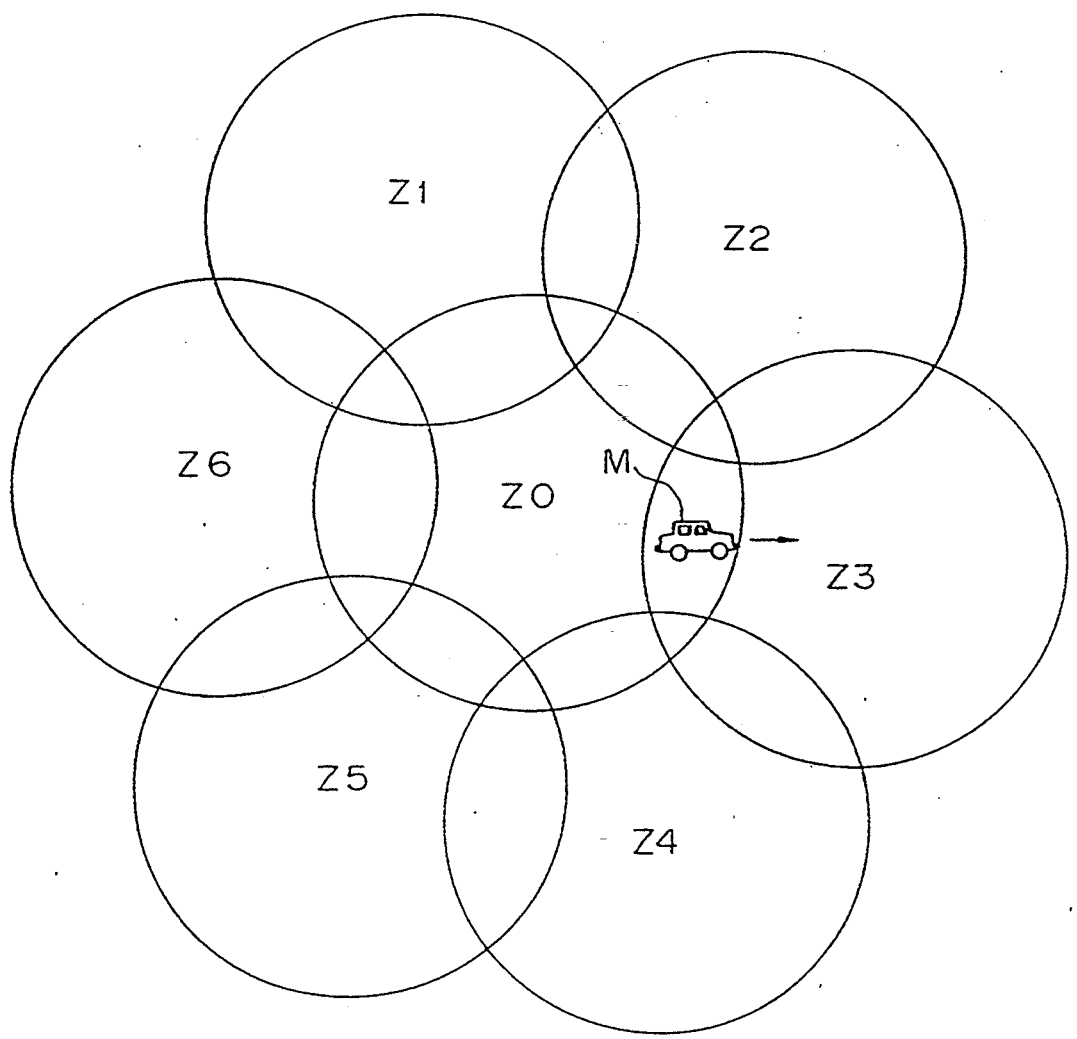
FIG. 1 is a plane view of the service areas of the mobile communication system.

Usually, in a mobile communication system, a service area of one land station, called a zone, is limited. FIG. 1 is a plane view for explaining the service areas (hereinafter called zones) of the conventional mobile communication system. When an automobile M is in zone ZO, a user of the mobile communication system in the automobile M (a mobile station) communicates to a person via a land station (not shown) of the zone ZO by using a certain channel in the zone ZO. However, if the automobile M moves into a zone Z3, and if the communication by the user in the automobile M is continued, the communication channel changes to a previously determined other related channel in the zone Z3. Namely, in the mobile communication system, the mobile station has to change communication channels according to the movement of the mobile station from a certain zone to another zone.

Figure 2:
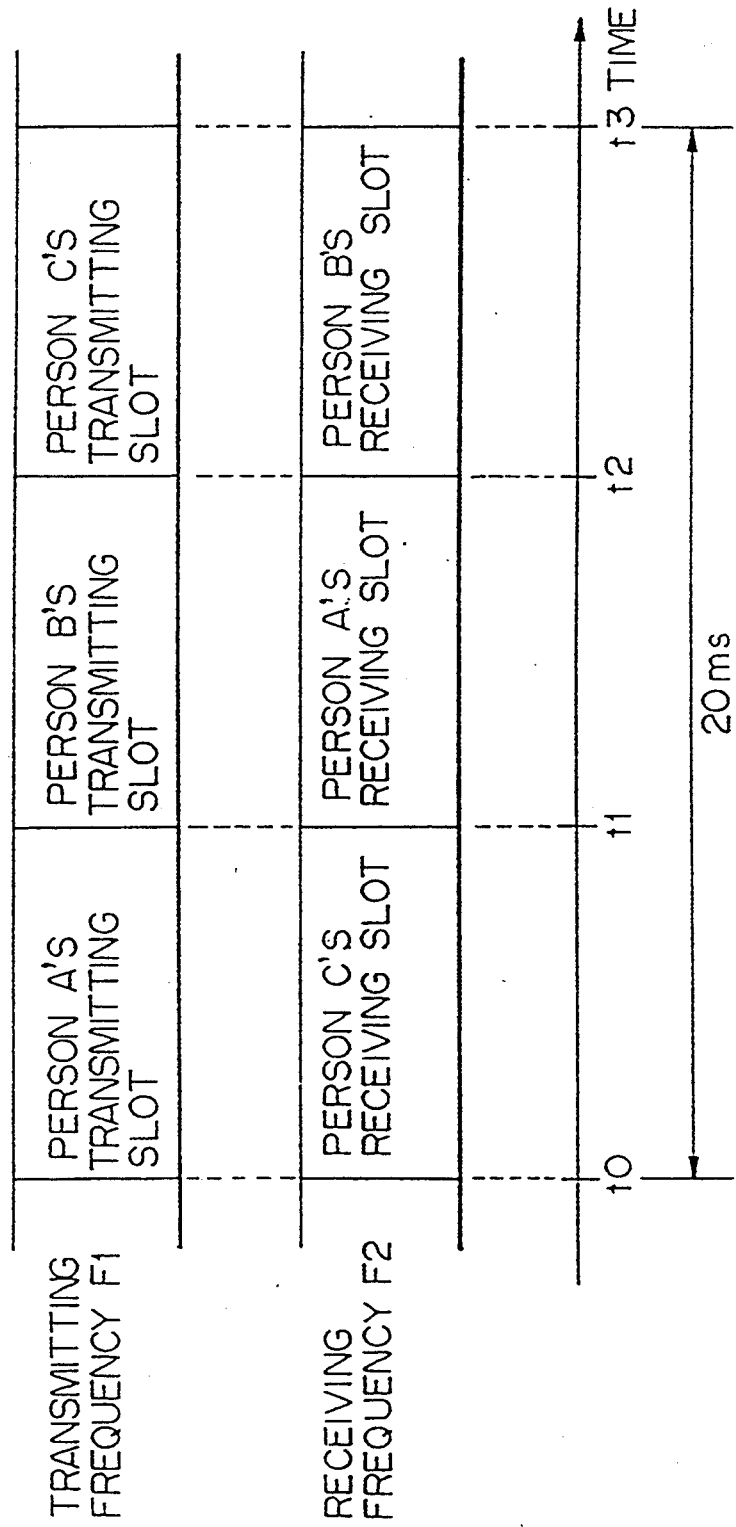
FIG. 2 is an explanatory chart showing that a transmitting frequency and a receiving frequency are shared by three users in a digital mobile communication system.

In the digital mobile communication system, a time-division multiple access (TDMA) is adopted for efficiency. In TDMA, a plurality of users, for example, three users occupy one frequency for transmission and another frequency for receiving to communicate by time-sharing. To make the explanation brief, the TDMA mobile communication system will be explained hereinafter wherein three users share one frequency. Namely, in the TDMA digital mobile communication system, one frequency is divided into a time unit called a slot of 20 ms as shown in FIG. 2. As shown in FIG. 2, one user (person A, B, or C) can use ⅓ of every slot, and by digital processing, time intervals between every slot for one user are omitted and a telephone call is smoothly continued.

Figure 3:
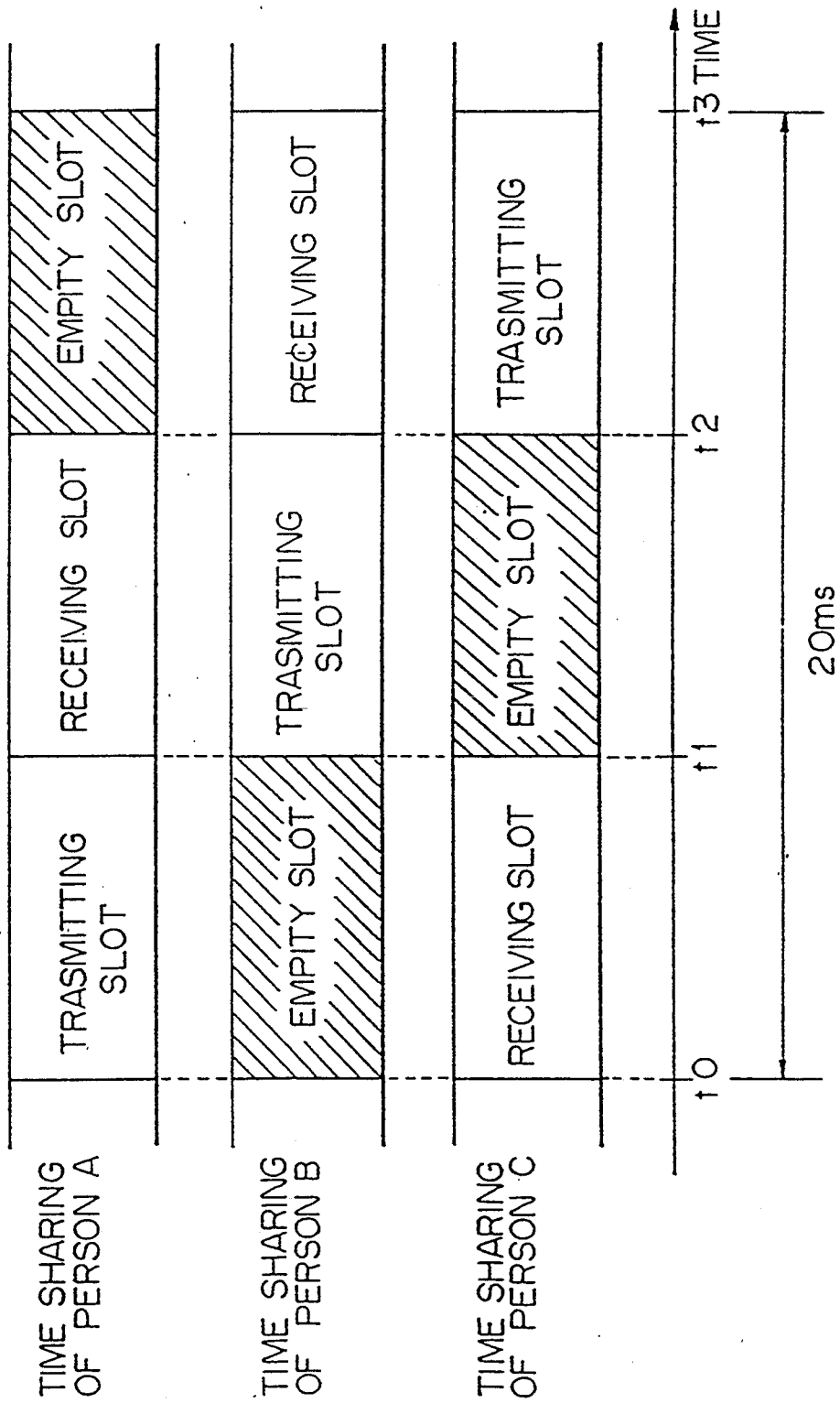
FIG. 3 is an explanatory chart showing three users' time sharing of one time unit in an digital mobile communication system.

Accordingly, from a point of time in the TDMA mobile communication system, one slot is divided into three, and ⅓ thereof is used for transmitting of a call, ⅓ thereof is used for receiving of a call, and ⅓ thereof is empty as shown in FIG. 3.

In the same way as in the mobile communication system, a service area of one land station that is called a zone is limited in the digital mobile communication system, and according to the movement of the mobile station from a certain zone to another zone, the mobile station has to change communication channels. Accordingly, in the TDMA digital mobile communication system, when the mobile station is communicating by using one channel at a certain zone, the mobile station intermittently detects the RSSI levels of the other channels in neighboring zones one by one by using the empty slot as shown in FIG. 3. Note that, the useable channel in the neighboring zone is previously determined by the system.

The detected RSSI levels of the other channels in the neighboring zones are reported one by one to the land station being communicated with, and the reported RSSI levels are monitored by the land station. As a result, when the mobile station moves to an another zone, a suitable channel having the highest RSSI level at the other zone is selected by the land station, and the switching of the communication channel is executed.

Figure 4:
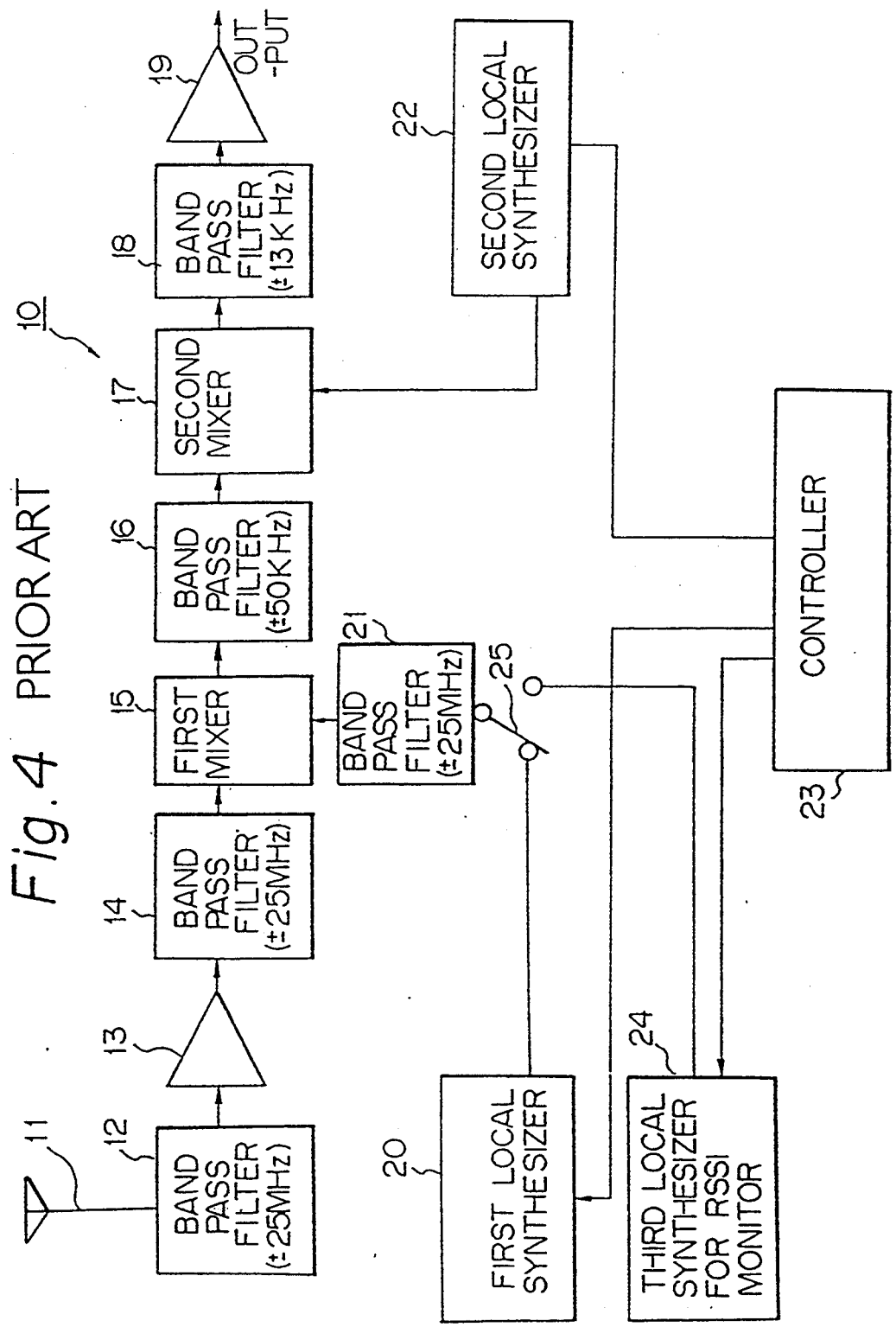
FIG. 4 is a block diagram showing the construction of the conventional RSSI level monitor circuit in a digital mobile communication system.

FIG. 4 is a block diagram showing the construction of the conventional RSSI level monitor circuit 10 in a digital mobile communication system. In FIG. 4, reference numeral 11 denotes an antenna, 12 denotes a band pass filter having a frequency band width of ±25 MHz, 13 denotes a radio frequency amplifier, 14 denotes a band pass filter having a frequency band width of ±25 KHz, 15 denotes a first mixer, 16 denotes a band pass filter having a frequency band width of ±50 KHz that functions as a first IF (Intermediate Frequency) transformer, 17 denotes a second mixer, 18 denotes a band pass filter having a frequency band width of ±13 KHz that functions as a second IF transformer, 19 denotes an amplifier, 20 denotes a first local synthesizer that functions as a local oscillator, 21 denotes a band pass filter having a frequency band width of ±25 MHz, 22 denotes a second local synthesizer that functions as a local oscillator, 23 denotes a controller of the system, 24 denotes a third local synthesizer for an RSSI monitor, and 25 denotes a switch. The switch 25 connects the first local synthesizer 20 to the system in the receiving slot and connects the third local synthesizer 24 to the system in the empty slot, by the control signals from the controller 23. The band pass filters 12, 14, and 21 are a dielectric type having a wide frequency band width, the band pass filter 16 is a surface acoustic wave (SAW)

type having a wide frequency band width, and the band pass filter 18 is a ceramic type having a narrow frequency band width.

In the receiving slot, a radio wave is captured by the antenna 11 and the captured radio frequency (for example 870 MHz) is applied to the first mixer after being filtered and amplified by the band pass filters 14 and the amplifier 13. The 870 MHz radio frequency is converted to the first intermediate frequency (for example 90 MHz) by being mixed with the first local oscillating frequency (in this case 780 MHz) from the first local synthesizer 20 through the band pass filter 21 at the first mixer 15. The 90 MHz first intermediate frequency is applied to the second mixer 17 through the band pass filter 16, and is then converted again to the second intermediate frequency (for example 455 KHz) by being mixed with the second local oscillating frequency (in this case 89.545 MHz) from the second local synthesizer 22. The second intermediate frequency is output as a received signal after being filtered by the band pass filter 18 and amplified by the amplifier 19.

In the empty slot, a third local oscillating frequency is applied to the first mixer 15 from the third local synthesizer 24 and one of the predetermined radio frequencies of the other channels in the neighboring zones is received. If the third local oscillating frequency is 800 MHz, a 890 MHz radio frequency of the other channel in one of the neighboring zones is received. Then the output signal level of the 890 MHz radio frequency from the amplifier 19 is detected as the RSSI level of the other channel in the neighboring zone. The detected RSSI level is transmitted in the next transmitting slot as a part of the transmission data to the land station (not shown), and the transmitted RSSI level data is stored in the memory of the land station, and the RSSI levels in the neighboring zones are continuously monitored by the land station. As a result, when the mobile station moves to an other zone, a suitable channel having the highest RSSI level at the other zone is selected by the land station, and the switching of the communication channel is executed.

Figure 5:
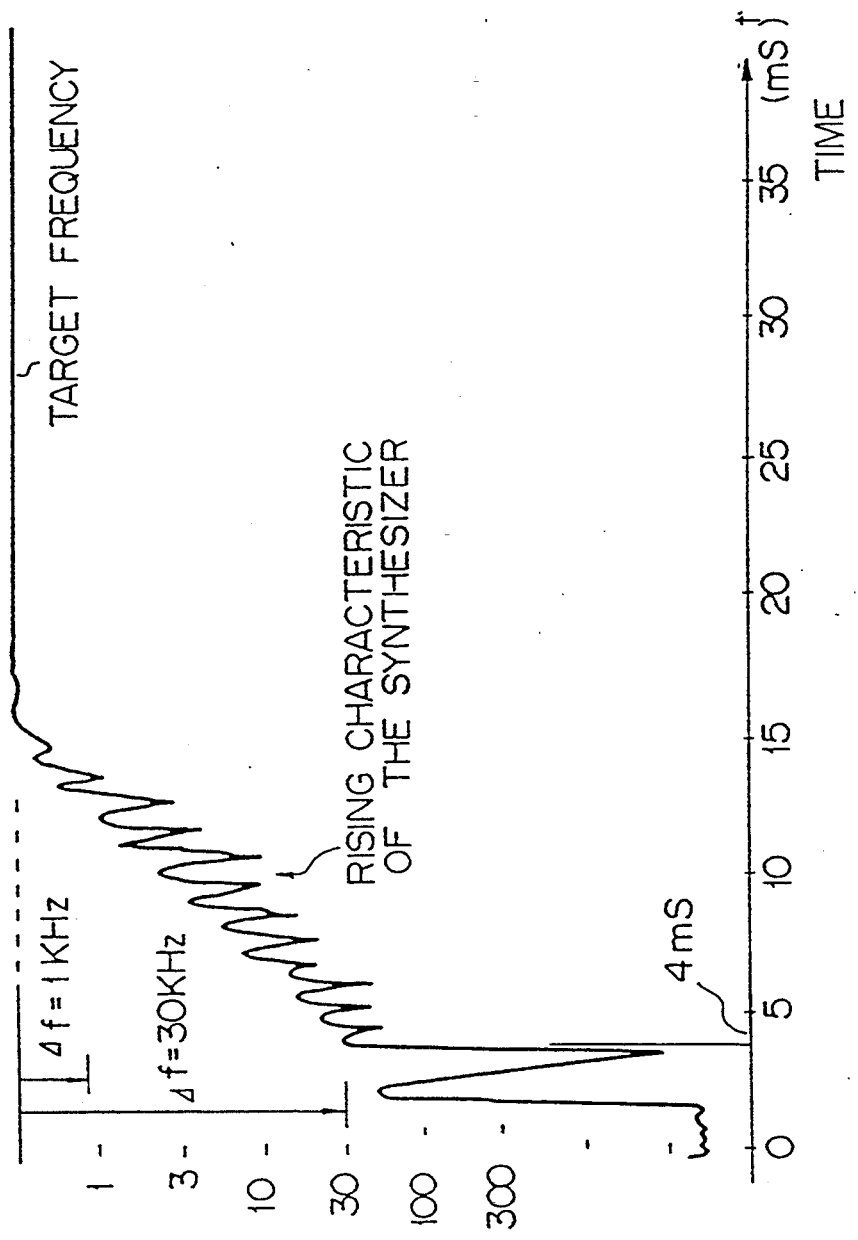
FIG. 5 is a graph showing rising characteristics of a local oscillator comprised of a general synthesizer as shown in FIG. 4.

FIG. 5 shows rising characteristics of the synthesizers 20, 22, and 24 in FIG. 4. As it is understood from FIG. 5, approximately 15 ms is required for the synthesizers 20, 22, and 24 to attain the target frequency (synchronized frequency). And, the rising characteristic in FIG. 5 indicates that about 14 ms is required for the synthesizers 20, 22, and 24 to synchronized to within ±1 KHz of the target frequency, and about a ms to synchronized to within ±30 KHz of the target frequency. Accordingly, in the TDMA digital mobile communication system wherein the empty slot has only about 6.7 ms, the output signal for the RSSI level monitor will not be output in the empty slot if the synthesizer 24 starts to oscillate at the beginning of the empty slot.

Figure 6:
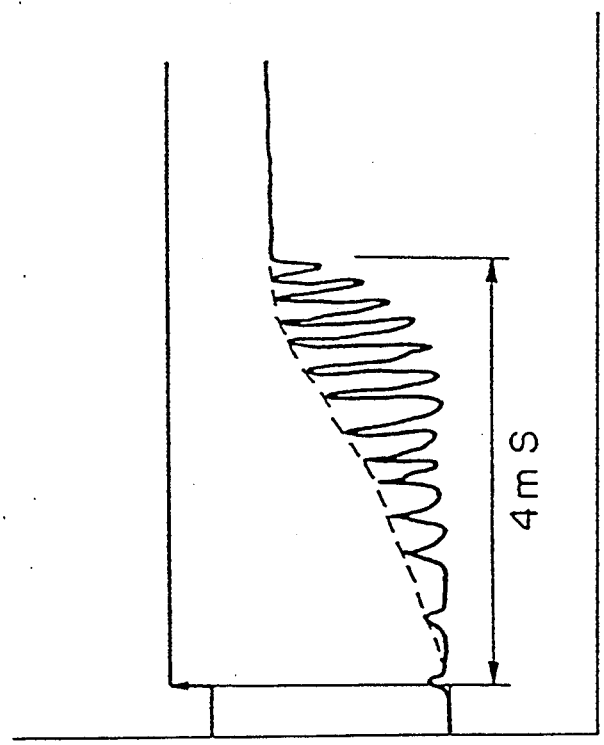
FIG. 6 is a graph showing rising characteristics of a second intermediate frequency filter having a narrow band width as shown in FIG. 4.

FIG. 6 shows rising characteristics of a second intermediate frequency filter (band pass filter) 18 having a narrow frequency band width in FIG. 4 and a dashed line indicates an envelope thereof. As is understood from FIG. 6, a ms is required for the RSSI level (voltage) to rise up to a target level.

Due to these characteristics, the time for detecting the RSSI level is approximately the same as the time required for the synthesizer 24 to synchronize, since the frequency band width of the filter 18 is only 13 KHz and the rising thereof becomes approximately the same as the synchronized time until the frequency of the synthesizer 24 converges to within ±5 KHz of the target frequency. Note that the detecting time of the RSSI level itself is within 0.5 ms.

Accordingly, it is required for the third local synthesizer 24 to start oscillating as the local oscillator at 800 MHz, at a predetermined time before the empty slot so that the convergence of the third local synthesizer 24 is realized soon after the change to the empty slot. Because of this, it is necessary to provide the third local synthesizer for the conventional TDMA digital mobile communication system and the cost of the system is increased.

Note that, if the rising characteristics of the synthesizer can be made very fast, the third local synthesizer can be omitted and the first local synthesizer can be used for the detection of the RSSI level by changing the oscillating frequency at the empty slot. However, a synthesizer having very fast rising characteristics is made more costly and the circuit diagram thereof is complicated, so that it is not desirable for down-sizing and for low power consumption. Accordingly, it is desired to realize a TDMA digital mobile communication system by which the detection of the RSSI level is executed at high-speed and without a large increase in the circuit elements.

Figure 7A:
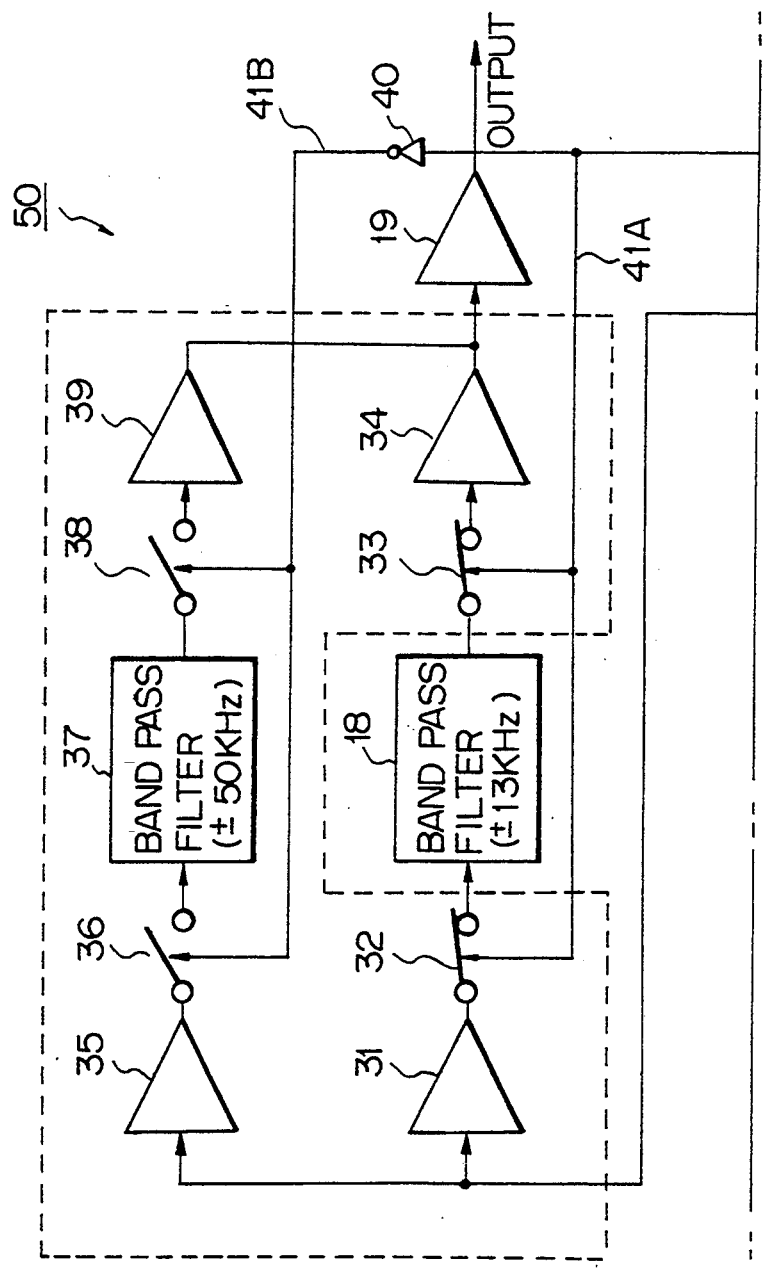

FIGS. 7A and 7B are a block diagram showing the construction of an RSSI level monitor circuit 50 according to the one embodiment of the present invention. In this embodiment, the fundamental structure of the RSSI level monitor circuit 50 is the same as the conventional RSSI level monitor circuit 10 as explained in FIG. 4, except for the addition of the parallel circuit between the second mixer 17 and the amplifier 18. Accordingly, in FIG. 7, the same parts as used in FIG. 4 are assigned the same reference numerals and the explanation thereof is abbriviated.

In FIGS. 7A and 7B, reference numeral 11 denotes an antenna, 12 denotes a band pass filter having a frequency band width of ±25 MHz, 13 denotes a radio frequency amplifier, 14 denotes a band pass filter having a frequency band width of ±25 KHz, 15 denotes a first mixer, 16 denotes a band pass filter having a frequency band width of ±50 KHz, 17 denotes a second mixer, 18 denotes a band pass filter having a frequency band width of ±13 KHz, 19 denotes an amplifier, 20 denotes a first local synthesizer, 21 denotes a band pass filter having a frequency band width of ±25 MHz, 22 denotes a second local synthesizer and 23 denotes a controller of the system. These elements are the same elements as in the conventional circuit 10.

In addition to these elements, in the present embodiment there are provided buffer amplifiers 31, 34, 35, and 39, ON/OFF switches 32, 33, 36 and 38, and a band pass filter having a frequency band width of ±50 KHz. The band pass filters 12, 14, and 21 are a dielectric type having a wide frequency band width, the band pass filters 16 and 37 are an SAW type having a wide frequency band width, and the band pass filter 18 is a ceramic type having a narrow frequency band width.

The buffer amplifier 31, the ON/OFF switch 32, the band pass filter 18, the ON/OFF switch 33, and the buffer amplifier 34 are connected in series in this order, the buffer amplifier 35, the ON/OFF switch 36, the band pass filter 37, the ON/OFF switch 38, and the buffer amplifier 39 are connected in series in this order, and these series connected circuits are connected in parallel between the second mixer 17 and the amplifier 19. Switching action of the switches 32 and 33 and the switches 36 and 38 are opposite, namely, when the switches 32 and 33 are ON, the switches 36 and 38 are OFF as shown in FIG. 7. The ON/OFF control signal to the switches 32, 33, 36, and 38 is transmitted from the controller 23 using a line 41. The line 41 is divided into a normal line 41A for the switches 32 and 33, and an inverted line 41B for the switches 36 and 38, and an inverter 40 is provided on the line 41B. Note that, the buffer amplifiers 31, 34, 35, and 39 are provided for suppressing a fluctuation of the load when switching the parallel circuit.

In the receiving slot, the switches 32 and 33 are ON and the switches 36 and 38 are OFF, so that radio waves captured by the antenna 11 (for example 870 MHz) are applied to the first mixer after being filtered and amplified by the band pass filters 12, 14 and the amplifier 13. The 870 MHz radio frequency is converted to the first intermediate frequency (for example 90 MHz) by being mixed with the first local oscillating frequency (in this case 780 MHz) from the first local synthesizer 20 through the band pass filter 21, at the first mixer 15. The 90 MHz first intermediate frequency is applied to the second mixer 17 through the band pass filter 16, and is then converted again to the second intermediate frequency (for example 455 KHz) by being mixed with the second local oscillating frequency (in this case 89.545 MHz) from the second local synthesizer 22. The second intermediate frequency is output as a received signal after passing through the buffer amplifier 31, the switch 32, the band pass filter 18 having a narrow frequency band width of ±13 KHz, the switch 33, and the buffer amplifier 34, and is amplified by the amplifier In the empty slot, the switches 32 and 33 are turned OFF and the switches 36 and 38 are turned ON, and the first synthesizer oscillates at a predetermined different frequency for detecting the level of another channel in a neighboring zone, so that one of the predetermined radio frequencies of the other channels in the neighboring zones is received. If the local oscillating frequency is 800 MHz, a 890 MHz radio frequency of another channel in one of the neighboring zones is received. The 890 MHz radio frequency is converted to the first intermediate frequency of 90 MHz by being mixed with the first local oscillating frequency of 800 MHz from the first local synthesizer 20 through the band pass filter 21, at the first mixer 15.

The 90 MHz first intermediate frequency is applied to the second mixer 17 through the band pass filter 16, and is then converted again to the second intermediate frequency of 455 KHz by being mixed with the second local oscillating frequency of 89.545 MHz from the second local synthesizer 22.

The 455 KHz second intermediate frequency is output as a received signal after passing through the buffer amplifier 35, the switch 36, the band pass filter 37 having a wide frequency band width of ±50 KHz, the switch 38, and the buffer amplifier 39, and is amplified by the amplifier 19. Then the output signal level of the 890 MHz radio frequency from the amplifier 19 is detected as the RSSI level of the other channel in the neighboring zone. The detected RSSI level is transmitted in the next transmitting slot as a part of the transmitting data to the land station (not shown), and the transmitted RSSI level data is stored in the memory of the land station, and the RSSI levels in the neighboring zones are continuously monitored by the land station. As a result, when the mobile station moves to another zone, a suitable channel having the highest RSSI level at the other zone is selected by the land station, and the switching of the communication channel is executed.

As described above, the RSSI monitor signal passes through the band pass filter 37 having a frequency band width of 50 KHz in the empty slot, so that the detection of the RSSI level can be executed during the empty slot having 6.7 ms, since it is possible to detect the RSSI level when the frequency of the synthesizer 20 synchronizes to within ±30 KHz of the target frequency which is 4 ms as shown in FIG. 5.

FIG. 8A shows a channel switching signal from the controller to the switches 32, 33, 36, and 38 that changes at the beginning of the empty slot, FIGS. 8B and 8C are timing charts of the band pass filter 18 having a narrow frequency band width and the band pass filter 37 having a wide frequency band width after the channel switching signal is changed. As shown in FIGS. 8B and 8C, the output voltage of the band pass filter 37 rises very fast as compared with the band pass filter 18. Note that the rising characteristics of the filters 18 and 37 are shown as an envelope.

In this way according to the present invention, it is possible to detect the RSSI level without providing the third local synthesizer but by changing the oscillating frequency of the first local synthesizer and by changing the band pass filter having a wide frequency band width at the empty slot, and the TDMA digital mobile communication system can be realized at a low cost.

What is claimed is:

1. In a digital mobile communication system including one communication channel for a plurality of system users by time sharing, the communication channel operating in a certain zone and switching to a predetermined other communication channel when the user moves from said communication zone to one of a plurality of neighboring zones, a monitoring circuit in a mobile station for receiving and detecting levels of predetermined control channels in said neighboring zones by using an empty slot of said communication channel for preparing for said channel switching during the communication of a user in said channel said monitor circuit comprising:

a radio frequency amplifying means for amplifying a radio frequency signal received by an antenna;

a first local oscillator comprised of a synthesizer;

a first mixer for mixing said amplified radio frequency signal and an output signal of said first local oscillator;

a first intermediate frequency filter having a wide band-pass range for passing a first intermediate frequency from said first mixer;

a second local oscillator comprised of a synthesizer;

a second mixer for mixing an output signal of said first intermediate frequency filter and an output signal of said second local oscillator;

a second intermediate frequency filter having a narrow band-pass range for passing a second intermediate frequency from said second mixer;

a third intermediate frequency filter provided in parallel to said second intermediate frequency filter having a wide band-pass range for passing said second intermediate frequency from said second mixer;

control means for changing output frequencies of said first and second oscillators during the communication of said user, said control means monitoring said receiving levels in said neighboring zones, by using said empty slot, at outputs of said second and third intermediate frequency filter and switch means for switching the connection of said second mixer between said second and third intermediate frequency filters in accordance with a control signal from said controller, said switch means connecting said second mixer to said second intermediate frequency filter for said user's communication and connecting said second mixer to said third intermediate frequency filter for detecting said receivable levels during said empty slot.

2. A monitor circuit as set forth in claim 1, wherein said switch means is comprised of first and second switches provided at front and rear stages of said second intermediate frequency filter and third and fourth switches provided at front and rear stages of said third intermediate frequency filter and ON/OFF functions of said first and second switches and said third and fourth switches are opposite.

3. A monitor circuit as set forth in claim 2, wherein said second intermediate frequency filter having a narrow band width has a band pass range of ±13 KHz and said third intermediate frequency filter having a wide band width has a band pass range of ±50 KHz.

4. A monitor circuit as set forth in claim 1, wherein said wide band pass range of said third intermediate frequency filter being wide enough for said control means to change said oscillators and said oscillators to synchronize to a target frequency for monitoring said receiving levels during a time period of said empty slot.

* * * * *

UNITED STATES PATENT AND TRADEMARK OFFICE
CERTIFICATE OF CORRECTION

PATENT NO. : 5,423,064
DATED : June 6, 1995
INVENTOR(S) : Sakata

It is certified that error appears in the above-indentified patent and that said Letters Patent is hereby corrected as shown below:

```
Column 3, line 18, delete "the" and insert --a--.

Column 4, line 12, delete "≠" and insert --⅓--.

Column 5, line 7, after "filters" insert --12,--.

Column 5, line 49, delete "a" and insert --4--.

Column 5, line 60, delete "a" and insert --4--.

Column 7, line 32, after "amplifier" (second occurrence)
```
insert --19.--.

Signed and Sealed this

Third Day of October, 1995

Attest:

Attesting Officer

BRUCE LEHMAN

Commissioner of Patents and Trademarks